United States Patent
Yamaguchi et al.

(10) Patent No.: US 6,720,016 B2
(45) Date of Patent: Apr. 13, 2004

(54) FLAVOR COMPOSITION AND STABLE TRANSPARENT DRINK CONTAINING THE SAME

(75) Inventors: Kayoko Yamaguchi, Kanagawa (JP); Masaharu Nagao, Kanagawa (JP)

(73) Assignee: Takasago International Corporation, Tokyo (JP)

( * ) Notice: Subject to any disclaimer, the term of this patent is extended or adjusted under 35 U.S.C. 154(b) by 129 days.

(21) Appl. No.: 09/846,394

(22) Filed: May 2, 2001

(65) Prior Publication Data

US 2002/0028280 A1 Mar. 7, 2002

Related U.S. Application Data

(63) Continuation-in-part of application No. 09/469,161, filed on Dec. 21, 1999, now abandoned.

(30) Foreign Application Priority Data

Dec. 28, 1998 (JP) .......................................... P.10-373336
Jul. 9, 1999 (JP) .......................................... P.11-195298

(51) Int. Cl.$^7$ ................................................ A23L 2/44
(52) U.S. Cl. ........................ 426/74; 426/549; 426/575; 426/602; 426/658
(58) Field of Search ...................... 426/74, 549, 575, 426/602, 658

(56) References Cited

U.S. PATENT DOCUMENTS

| 4,960,602 A | 10/1990 | Talkington et al. | 426/534 |
| 5,914,149 A | 6/1999 | Tomida | 426/654 |
| 6,458,395 B1 * | 10/2002 | Emoto | 426/72 |

FOREIGN PATENT DOCUMENTS

| JP | 58-103325 | 6/1983 | ........ A61K/47/00 |
| JP | 5-11937 | 2/1993 | ........ A23F/5/14 |
| JP | 7-123956 | 5/1995 | ........ A23L/2/44 |
| JP | 7-123958 | 5/1995 | ........ A23L/3/00 |
| JP | 8-182485 | 7/1996 | ........ A23L/2/44 |
| JP | 9-275948 | 10/1997 | ........ A23L/2/00 |

* cited by examiner

Primary Examiner—Helen Pratt
(74) Attorney, Agent, or Firm—Sughrue Mion, PLLC

(57) ABSTRACT

Disclosed is a flavor composition comprising a flavor such as peach, orange, etc., with a sucrose fatty acid having an HLB of 16 to 19, preferably sucrose monopalmitate, and lysolecithin, optionally together with a polyglycerol fatty acid ester and/or monoglycerol fatty acid ester; and stable, acidic and transparent drinks containing these flavor compositions.

7 Claims, No Drawings

FLAVOR COMPOSITION AND STABLE TRANSPARENT DRINK CONTAINING THE SAME

This is a Continuation-in-Part of application Ser. No. 09/469,161 (Confirmation No. Unknown) filed Dec. 21, 1999 now abandoned.

FIELD OF THE INVENTION

This invention relates to flavor compositions needed in producing stable and transparent drinks, in particular, carbonate-free transparent drinks (carbonate-free soft drinks, near water, etc.) and stable and transparent drinks with the use of the same.

BACKGROUND OF THE INVENTION

Sucrose fatty acid esters have been frequently employed as emulsion dispersants for foods. In the field of food industry, in particular, sucrose fatty acid esters are the only synthetic surfactants with a high HLB authorized at present under the Food Sanitation Law and, therefore, have been used over an extremely broad range. For example, sucrose fatty acid esters are employed as excellent emulsion dispersants in emulsifying oil-soluble carotenoids, azo dyes or natural dyes dissolved in animal or vegetable oils to give water-dispersible colorants.

However, these emulsifiers thus prepared have a serious disadvantage in practice. That is to say, they can be easily emulsified and dispersed in water within the neutral range and thus cause coloration but show turbidity or precipitation in water within the acidic region. To solve this problem, JP-A-58-103325 has disclosed a process for producing a coloring preparation easily dispersible in an acidic solution which contains lecithin and/or a polyglycerol fatty acid ester in a system being emulsified and dispersed with a sucrose fatty acid ester (the term "JP-A" as used herein means an "unexamined published Japanese patent application").

On the other hand, JP-B-5-11937 (the term "JP-B" as used herein means an "examined Japanese patent publication") has disclosed a coffee drink containing milk components together with lysolecithin which can sustain a high emulsion stability over a long period of time and in which the extermination ratio of thermostable bacterial spores can be increased without elevating the sterilization temperature or the germination and propagation of thermostable bacterial spores can be inhibited even though the thus sterilized coffee drink containing milk component is stored at a high temperature. In JP-B-5-11937, it is disclosed that the lysolecithin contains at least 50% by weight of the lysolecithin components in the total phospholipids and 0.01 to 0.5% by weight of lysolecithin is added to the coffee drink containing milk components.

Moreover, JP-A-7-123956 has proposed a bacteriostatic agent for coffee drinks containing milk components which contains lysolecithin with an organic acid monoglyceride. In this case, the lysolecithin is one member selected from among lysophosphatidylcholine, lysophosphatidylethanolamine, lysophosphatidylinositol and lysophosphatidylserine or a mixture of two or more thereof.

JP-A-7-123958 has disclosed a food product put in a thermally sterilized sealed packaged container and a process for producing the same wherein lysolecithin is added to thereby improve a method for inhibiting the germination and propagation of thermostable bacterial spores by using a large amount of a sucrose fatty acid ester together with a sorbitan fatty acid ester.

JP-A-8-182485 has suggested that oil-off arising during storage of milk drinks at a high temperature in, for example, a hot vending machine can be effectively prevented by adding an emulsifier containing a sucrose fatty acid ester having an HLB of 15 to 16 and enzyme-treated lecithin or enzyme-hydrolyzed lecithin. Furthermore, JP-A-9-275948 has disclosed a liquid food having an improved flavor which contains enzyme-treated or enzyme-hydrolyzed lecithin, fats and oils and polyglycerol fatty acid ester. These additives can improve the flavor and prevent insoluble solid matters (tea, useful microbial cells, herb drug powder, etc.) from sedimentation in the liquid food containing the same.

However, the liquid food as described above contains insoluble solid matters and hardly soluble components (milk products, etc.). The published application as cited above aims at preventing the sedimentation of these components, inhibiting the germination and propagation of thermostable bacterial spores, preventing oil-off and improving the flavor. Namely, it relates neither to a flavor nor a transparent drink containing a flavor as in the present invention.

SUMMARY OF THE INVENTION

An object of the present invention is to provide a flavor composition which is soluble to give a transparent solution without forming any insoluble precipitate or causing turbidity, when added to a transparent drink to thereby impart a flavor thereto.

Another object of the present invention is to provide a stable and transparent drink wherein the propagation of microorganisms originating in the water, sugars and other food materials constituting the drink or microorganisms invading thereinto in the course of the production can be inhibited.

To solve the above-described problems, the present inventors have conducted intensive studies. As a result, they have found out that a stable and transparent drink can be obtained by using a flavor combined with an emulsifier having an antibacterial effect, etc., thus completing the present invention.

When only a sucrose fatty acid ester is added to an acidic drink, the resulting drink does not become transparent, but shows precipitation or cloudiness. Especially in the case of a sucrose fatty acid ester having a lower monoester content, higher precipitation and cloudiness are found. According to the present invention, lysolecithin is used in combination with a sucrose fatty acid ester which is added to an acidic drink, which makes it possible to prevent the sucrose fatty acid ester from precipitating. Moreover, it has been found that the use of lysolecithin in combination can prevent precipitation of a sucrose fatty acid ester having a low monoester content.

Accordingly, the present invention provides a flavor composition which contains a flavor, a sucrose fatty acid ester having an HLB of 16 to 19 and lysolecithin optionally together with a polyglycerol fatty acid ester having an HLB of 12 to 15 and/or a monoglycerol fatty acid ester having an HLB of 0 to 1, and a stable and transparent drink containing the same.

DETAILED DESCRIPTION OF THE INVENTION

The sucrose fatty acid ester having an HLB of 16 to 19 to be used in the present invention is not particularly restricted and those consisting of saturated or unsaturated fatty acids are usually employed therefor. Examples thereof include sucrose esters of saturated fatty acids (lauric acid, myristic acid, palmitic acid, stearic acid, arachic acid, etc.) and unsaturated fatty acids (oleic acid, linoleic acid, linolenic acid, arachidonic acid, erucic acid, etc.). Among all, sucrose palmitate is preferable therefor.

Although it is said that sucrose fatty acid monoesters have an HLB of 16, i.e., a high solubility in water, sucrose fatty acid esters cannot be provided as a transparent solution because of the diesters and triesters contained therein which are insoluble in water at ordinary temperatures. Accordingly, the monoester purity is an important factor in obtaining a transparent solution. It is preferable to use a sucrose fatty acid ester containing 70% by weight or more, still preferably 95% by weight or more, of monoester. To obtain an aqueous solution having an antibacterial effect, the monoester content serves as an important factor. A higher antibacterial effect can be established at the larger monoester content. In the case of a drink, it is preferable that the monoester content ranges from 10 ppm to 0.1% by weight, though it varies depending on the contaminating bacteria. It is known that no antibacterial effect can be achieved in some cases at a monoester content less than 10 ppm. When its content exceeds 0.1% by weight, on the other hand, there might arise some troubles relating to solubility, i.e., turbidity and precipitation. In a flavor composition, the monoester content generally ranges from 0.5 to 5% by weight, though it varies depending on the addition level to drinks.

The lysolecithin to be used in the present invention is not particularly restricted. For example, use can be made therefor of enzyme-modified lecithin, enzyme-treated lecithin or enzyme-hydrolyzed lecithin which contains as the main component lysolecithin (1-monoacylglycerophospholipid), which is obtained by enzymatically hydrolyzing natural substance-derived lecithin (1,2-diacylglycerophospholipid) such as soybean lecithin or yolk lecithin and then eliminating the thus formed free fatty acids and fat-soluble components originating in the starting material. The enzyme to be used herein is not particularly restricted and exemplified by phospholipase, lipase, etc.

The lysolecithin of the present invention is one member selected from among lysophosphatidylcholine, lysophosphatidylethanolamine, lysophosphatidylinositol and lysophosphatidylserine or a mixture of two or more thereof. It is preferable that the lysolecithin of the present invention contains 50% by weight or more of the lysolecithin component based on the total phospholipids. It is undesirable that the content of the lysolecithin component is less than 50% by weight. This is because, in such a case, the excellent effect of the present invention of providing a transparent drink is deteriorated by the impurities or the taste of the drink is undesirably affected thereby, when the flavor composition is added to a drink.

The amount of the lysolecithin to be added varies depending on the purity of the monoester in the sucrose fatty acid ester as described above. In general, it is preferable to add the lysolecithin in an amount necessary for solubilizing impurities, i.e., from 0.01 to 1.0 part by weight, still preferably from 0.01 to 0.1 part by weight per part by weight of the sucrose fatty acid ester. When the amount of the lysolecithin is less than 0.01 part by weight, the effects of the present invention can be little achieved. On the other hand, it is undesirable that the content thereof exceeds 1.0 part by weight, since the lysolecithin deteriorates the taste.

In the present invention, a polyglycerol fatty acid ester having an HLB of 12 to 15 and/or a monoglycerol fatty acid ester having an HLB of 0 to 1 may be added together with the above-described components. As the polyglycerol fatty acid ester wherein polyglycerol obtained by polymerizing glycerol has been esterified with a fatty acid, use can be made of pentaglycerol or decaglycerol monolaurate, pentaglycerol or decaglycerol monostearate, pentaglycerol or decaglycerol monopalmitate, pentaglycerol or decaglycerol monomyristate, or pentaglycerol or decaglycerol monooleate each having an HLB of 12 to 15. Preferable examples thereof include decaglycerol monostearate and decaglycerol monolaurate. When the polyglycerol fatty acid ester has an HLB less than 12, it is hardly soluble in water. When the polyglycerol fatty acid ester has an HLB exceeding 15, on the other hand, an O/W type emulsion can be hardly formed.

As the monoglycerol fatty acid ester, it is preferable to use a monoglyceride having a purity of 90% by weight or above which is obtained by ester-interchanging an edible fat or oil and then subjecting the thus obtained monoglyceride to molecular distillation, etc. Examples thereof include monoglycerol oleate, monoglycerol laurate, monoglycerolmonostearate, monoglycerol monopalmitate, monoglycerol monomyristate and monoglycerol monooleate each having an HLB of 0 to 1. A preferable example thereof is monoglycerol oleate and one having a monoester content of 75% or more is still preferable. A monoglycerol fatty acid ester having an HLB of 0 to 1 should be used therefor, since such a monoglycerol fatty acid ester has a highly lipophilic nature, forms an O/W type emulsion and is highly soluble in oil, thereby contributing to the stabilization of the emulsion.

Per part by weight of the sucrose fatty acid ester employed as the base component, it is preferable to use 0.1 to 4 parts by weight (still preferably 0.1 to 2 parts by weight) of the polyglycerol fatty acid ester and 0.002 to 0.05 parts by weight (still preferably 0.005 to 0.05 parts by weight) of the monoglycerol fatty acid ester.

The flavor to be contained in the flavor composition may be in various forms including liquid and powder. It is preferable to use fruit flavors suitable for drinks, for example, peach, grape, apple, orange, lemon and grapefruit flavors. The content of the flavor is determined depending on the amount of the flavor composition to be added to a drink. Since the amount of the flavor composition to be added to a drink is determined depending on the flavor level varying from drink to drink, any specific flavor content can be hardly determined. In general, the flavor composition contains from 0.001 to 2% by weight of the flavor.

The flavor composition according to the present invention can be produced by an arbitrary process without restriction. For example, it can be produced in the following manner. Namely, a sucrose fatty acid ester and lysolecithin are added to deionized water containing purified glycerol. If needed, a polyglycerol fatty acid ester and/or a monoglycerol fatty acid ester are further added thereto. Then the resultant mixture is thermally sterilized at 80° C. for 30 minutes. After adding a flavor (a peach flavor, etc.) thereto, the mixture is stirred in a mixer at 3,000 to 10,000 rpm at room temperature to 60° C. for 5 to 30 minutes.

The term "pH suitable for the acidic transparent drink" means a range of from pH 3.5 to 4.0.

The drink of the present invention is a stable, acidic and transparent drink which has a pH of from 3.5 to 4.0.

The drink of the present invention is not particularly limited as long as it is a stable, acidic, transparent drink, and a carbonate-free acidic transparent drink is preferable.

Examples of the carbonate-free acidic transparent drink include carbonate-free soft drinks containing fruit juice, carbonate-free soft drinks containing no fruit juice, sports drinks or isotonic drinks such as drinks which increase the ion levels in the body, carbonate-free flavored water, near water, etc.

A product such as a carbonate-free transparent drink can be produced in the following manner. Namely, a syrup containing sugars (granulated sugar, fructose, liquid sugar, etc.), souring agents (citric acid, etc.), purified water and, if desired, fruit juice is mixed and then about 1% by weight of the flavor composition is added thereto. Then the obtained mixture is thermally sterilized at, for example, 120° C. for 10 seconds and then filled into containers followed by cooling.

The present invention will be described in greater detail by reference to the following Examples.

EXAMPLE 1

Flavor compositions containing the components listed in the following Table 1 were prepared as follows. Purified glycerol, deionized water and emulsifiers, i.e., RYOTO® MONOESTER-P (sucrose palmitate 95%, manufactured by Mitsubishi Chemical Foods) and BASIS LG-10K (lysolecithin, manufactured by The Nisshin Oil Mills) were mixed together and then sterilized (80° C., 30 minutes). Next, a flavor (peach) was added thereto and the resultant mixture was emulsified in a TK mixer at 3,000 rpm for 10 minutes at 50° C. to give each flavor composition.

By using each flavor composition thus obtained, a carbonate-free transparent drink was produced and evaluated in stability. Namely, purified water was mixed with granulated sugar and sodium citrate thereby adjusting to Brix 7.5 and pH 3.5. The obtained mixture was poured into glass bottles (100 ml). After adding 1% by weight of the flavor composition, the mixture was sterilized at 80° C. for 20 minutes and then stored in an incubator at 60° C. After 6 days, the product was observed with the naked eye and evaluated in accordance with the following criteria.

0: Being transparent without any suspended matter.
x: Showing suspended matters and precipitate.
Table 1 summarizes the results.

TABLE 1

| | 1 | 2 | 3 | 4 | 5 | 6 | 7 | 8 |
|---|---|---|---|---|---|---|---|---|
| | (part by weight) | | | | | | | |
| Flavor | 0.2 | 0.2 | 0.2 | 0.2 | 0.2 | 0.2 | 0.2 | 0.2 |
| RYOTO ® MONO-ESTER-P | 1.0 | 1.0 | 1.0 | 1.0 | 1.0 | 1.0 | 1.0 | 1.0 |
| BASIS LG-10K | 0.02 | 0.04 | 0.05 | 0.06 | 0.07 | 0.08 | 0.1 | 1.0 |
| Purified glycerol | 40 | 40 | 40 | 40 | 40 | 40 | 40 | 40 |
| Deionized water | 58.78 | 58.76 | 58.75 | 58.74 | 58.73 | 58.72 | 58.7 | 57.8 |
| Evaluation | ○ | ○ | ○ | ○ | ○ | ○ | ○ | ○ |

EXAMPLE 2 AND COMPARATIVE EXAMPLE 1

Flavor compositions containing the components listed in the following Table 2 were obtained as in Example 1 and then evaluated as in Example 1. Table 2 summarizes the results. In the preparation of the flavor compositions, a polyglycerol fatty acid ester D1-S (decaglycerol monostearate; manufactured by Nikko Chemical) was mixed together with other emulsifiers.

TABLE 2

| | Ex. 2 | | | | | Com. Ex. |
|---|---|---|---|---|---|---|
| | 1 | 2 | 3 | 4 | 5 | 1 |
| | (part by weight) | | | | | |
| Flavor | 0.2 | 0.2 | 0.2 | 0.2 | 0.2 | 0.2 |
| RYOTO ® MONOESTER-P | 1.0 | 1.0 | 1.0 | 1.0 | 1.0 | 1.0 |
| BASIS LG-10K | 0.05 | 0.05 | 0.05 | 0.05 | 0.05 | — |
| D1-S | 0.5 | 1.0 | 2.0 | 3.0 | 4.0 | — |
| Purified glycerol | 40 | 40 | 40 | 40 | 40 | 40 |
| Deionized water | 58.25 | 57.75 | 56.75 | 55.75 | 54.75 | 58.8 |
| Evaluation | ○ | ○ | ○ | ○ | ○ | x |

EXAMPLE 3 AND COMPARATIVE EXAMPLE 2

Flavor compositions containing the components listed in the following Table 3 were obtained as in Example 1 and then evaluated as in Example 1. Table 3 summarizes the results. In the preparation of the flavor compositions, a monoglycerol fatty acid ester EMALGY HRO (fatty acid: 75.0% of oleic acid; manufactured by Riken Vitamin) was mixed together with other emulsifiers.

TABLE 3

| | Ex. 3 | | Com. Ex. |
|---|---|---|---|
| | 1 | 2 | 2 |
| | (part by weight) | | |
| Flavor | 0.2 | 0.2 | 0.2 |
| RYOTO ® MONOESTER-P | 1.0 | 1.0 | 1.0 |
| BASIS LG-10K | 0.02 | 0.02 | — |
| EMALGY HRO | 0.01 | 0.05 | 0.05 |
| Purified glycerol | 40 | 40 | 40 |
| Deionized water | 58.77 | 58.73 | 58.75 |
| Evaluation | ○ | ○ | x |

EXAMPLE 4 AND COMPARATIVE EXAMPLE 3

Flavor compositions containing the components listed in the following Table were obtained as in Example 1 and then evaluated as in Example 1. The following Table summarizes the results.

| | Ex. | | | | Com. Ex. |
|---|---|---|---|---|---|
| | 1 | 2 | 3 | 4 | |
| | (part by weight) | | | | |
| Flavor | 0.2 | 0.2 | 0.2 | 0.2 | 0.2 |
| RYOTO ® Sugar Ester P-1570 | 1.0 | 1.0 | 1.0 | 1.0 | 1.0 |
| BASIS LG-10K | 0.5 | 0.05 | 0.5 | 0.5 | — |
| D1-S | — | 4.0 | 0.5 | 1.5 | — |
| Purified glycerol | 40.0 | 40.0 | 40.0 | 40.0 | 40 |
| Deionized water | 58.3 | 54.75 | 57.8 | 58.8 | 58.8 |
| Evaluation | ○ | ○ | ○ | ○ | x |

RYOTO ® Sugar Ester P-1570: a sucrose palmitate having a monoester content of 70% by weight manufactured by Mitsubishi Chemical Foods.

EXAMPLE 5

Flavor compositions containing the components listed in the following Table 5 were obtained as in Example 1 and then evaluated as in Example 1. Table 5 summarizes the results.

TABLE 5

|  | Ex. 5 | | | | |
| --- | --- | --- | --- | --- | --- |
|  | 1 | 2 | 3 | 4 | 5 |
|  | (part by weight) | | | | |
| Flavor | 0.2 | 0.2 | 0.2 | 0.2 | 0.2 |
| RYOTO ® MONOESTER-P | 0.5 | 0.5 | 3.0 | 3.0 | 5.0 |
| BASIS LG-10K | 0.05 | 0.5 | 0.03 | 3.0 | 5.0 |
| Purified glycerol | 40.0 | 40.0 | 40.0 | 40.0 | 40.0 |
| Deionized water | 59.25 | 58.8 | 56.77 | 53.8 | 49.8 |
| Evaluation | ○ | ○ | ○ | ○ | ○ |

EXAMPLE 6 AND COMPARATIVE EXAMPLE 4

Flavor compositions containing the components listed in the following Table 6 were obtained as in Example 1 and then evaluated as in Example 1. Table 6 summarizes the results.

TABLE 6

|  | Ex. 6 | | | | Com. Ex. 4 |
| --- | --- | --- | --- | --- | --- |
|  | 1 | 2 | 3 | 4 | 4 |
|  | (part by weight) | | | | |
| Flavor | 0.2 | 0.2 | 0.2 | 0.2 | 0.2 |
| RYOTO ® MONOESTER-P | 0.5 | 0.5 | 0.5 | 0.5 | 1.0 |
| BASIS LG-10K | 0.04 | 0.04 | 0.25 | 0.25 | — |
| D1-S | 0.5 | 4.0 | 0.5 | 4.0 | — |
| Purified glycerol | 40.0 | 40.0 | 40.0 | 40.0 | 40.0 |
| Deionized water | 58.76 | 55.26 | 58.55 | 55.05 | 58.8 |
| Evaluation | ○ | ○ | ○ | ○ | ○ |

The following Examples show the effect for transparency by the combined use of BASIS LG-10K as a lysolecithin in the case of a carbonate-free transparent drink having pH 4.0.

EXAMPLE 7 AND COMPARATIVE EXAMPLE 5

Flavor compositions containing the components listed in the following table were obtained as in Example 1, transparent carbonate-free drinks having pH 4.0 were prepared as in Example 1, and then evaluated as in Example 1. The following table summarizes the results. In the preparation of flavor compositions in No. 2 of Example 7 and No. 2 of Comparative Example 5, a mixture of 0.67 part by weight of a sucrose fatty acid ester having a monoester content of 95% by weight (RYOTO® MONOESTER-P manufactured by Mitsubishi Chemical Foods; a sucrose palmitate having a monoester content of 95% by weight) and 0.33 part by weight of a sucrose fatty acid ester having a monoester content of 80% by weight (RYOTO® Sugar Ester P-1670 manufactured by Mitsubishi Chemical Foods; a sucrose palmitate having a monoester content of 80% by weight) was used as a sucrose fatty acid ester having a monoester content of 90% by weight.

|  | Ex. 7 | | Com. Ex. 5 | |
| --- | --- | --- | --- | --- |
|  | 1 | 2 | 1 | 2 |
|  | (part by weight) | | | |
| Flavor | 0.2 | 0.2 | 0.2 | 0.2 |
| Sucrose fatty acid ester | | | | |
| RYOTO ® MONOESTER-P | 1.0 | 0.67 | 1.0 | 0.67 |
| RYOT0 ® Sugar Ester P-1670 | — | 0.33 | — | 0.33 |
| Content of monoester | 95% | 90% | 95% | 90% |
| BASIS LG-10K | 1.0 | 1.0 | — | — |
| Purified glycerol | 40.0 | 40.0 | 40.0 | 40.0 |
| Deionized water | 57.8 | 57.8 | 58.8 | 58.8 |
| Evaluation | ○ | ○ | x | x |

RYOTO ® MONOESTER-P: a sucrose palmitate having a monoester content of 95% by weight manufactured by Mitsubishi Chemical Foods.
RYOTO ® Sugar Ester P-1670: a sucrose palmitate having a monoester content of 80% by weight manufactured by Mitsubishi Chemical Foods.

EXAMPLE 8 AND COMPARATIVE EXAMPLE 6

Flavor compositions containing the components listed in the following Table were obtained as in Example 1, and then evaluated as in Example 1. The following Table summarizes the results. In the preparation of flavor compositions in No. 3 of Example 8 and No. 2 of Comparative Example 6, a mixture of 0.67 part by weight of a sucrose fatty acid ester having a monoester content of 95% by weight (RYOTO® MONOESTER-P manufactured by Mitsubishi Chemical Foods; a sucrose palmitate having a monoester content of 95% by weight) and 0.33 part by weight of a sucrose fatty acid ester having a monoester content of 80% by weight (RYOTO® Sugar Ester P-1670 manufactured by Mitsubishi Chemical Foods; a sucrose palmitate having a monoester content of 80% by weight) was used as a sucrose fatty acid ester having a monoester content of 90% by weight.

|  |  | Ex. 8 | | | | Com. Ex. 6 | | |
| --- | --- | --- | --- | --- | --- | --- | --- | --- |
|  |  | 1 | 2 | 3 | 4 | 1 | 2 | 3 |
|  |  | (part by weight) | | | | | | |
| Flavor |  | 0.2 | 0.2 | 0.2 | 0.2 | 0.2 | 0.2 | 0.2 |
| Sucrose fatty acid ester | RYOTO ® MONO-ESTER-P | — | — | 0.67 | 1.0 | — | 0.67 | 1.0 |
|  | RYOTO ® Sugar Ester P-1670 | — | 1.0 | 0.33 | — | — | 0.33 | — |
|  | RYOTO ® Sugar Ester P-1570 | 1.0 | — | — | — | 1.0 | — | — |
|  | Content of monoester | 70% | 80% | 90% | 95% | 70% | 90% | 95% |
| BASIS LG-10K |  | 0.5 | 1.0 | 1.0 | 1.0 | — | — | — |
| Purified glycerol |  | 40.0 | 40.0 | 40.0 | 40.0 | 40.0 | 40.0 | 40.0 |
| Deionized water |  | 58.3 | 57.8 | 57.8 | 57.8 | 58.8 | 58.8 | 58.8 |
| Evaluation |  | ○ | ○ | ○ | ○ | X | X | X |

RYOTO ® MONOESTER-P: a source palmitate having a monoester content of 95% by weight manufactured by Mitsubishi Chemical Foods.

-continued

| | Ex. 8 | | | | Com. Ex. 6 | | |
|---|---|---|---|---|---|---|---|
| | 1 | 2 | 3 | 4 | 1 | 2 | 3 |

RYOTO ® Sugar Ester P-1670: a sucrose palmitate having a monoester content of 80% by weight manufactured by Mitsubishi Chemical Foods.
RYOTO ® Sugar Ester P-1570: a sucrose palmitate having a monoester content of 70% by weight manufactured by Mitsubishi Chemical Foods.

Stable and transparent drinks suffering from neither precipitation nor turbidity can be obtained by appropriately adding the flavor composition according to the present invention to drinks, in particular, carbonate-free ones.

While the invention has been described in detail and with reference to specific embodiments thereof, it will be apparent to one skilled in the art that various changes and modifications can be made therein without departing from the spirit and scope thereof.

What is claimed is:

1. A stable, acidic, and transparent drink comprising a flavor composition comprising a flavor, a sucrose fatty acid ester having an HLB of 16 to 19 and lysolecithin, wherein said drink has a pH of from 3.5 to 4.0, and wherein said sucrose fatty acid ester has a monoester content of 70% by weight or more and said monoester is contained in an amount of from 0.5 to 5% by weight based on the weight of the flavor composition, and the weight ratio of said sucrose fatty acid ester/lysolecithin ranges from 1/0.01 to 1/1.0.

2. The stable, acidic, and transparent drink as claimed in claim 1, wherein said sucrose fatty acid ester is sucrose palmitate.

3. The stable, and acidic and transparent drink as claimed in claim 1, which further comprises at least one member selected from the group consisting of a polyglycerol fatty acid ester having an HLB of 12 to 15 and a monoglycerol fatty acid ester having an HLB of 0 to 1.

4. The stable, acidic and transparent drink as claimed in claim 3, wherein the content of said polyglycerol fatty acid ester and/or monoglycerol fatty acid ester ranges from 0.1 to 4 parts by weight in the case of polyglycerol fatty acid ester, or from 0.002 to 0.05 parts by weight in the case of monoglycerol fatty acid ester based on one part by weight of the sucrose fatty acid ester.

5. The stable, acidic and transparent drink as claimed in claim 3, wherein said polyglycerol fatty acid ester is one or two members selected from the group consisting of decaglycerol monostearate and decaglycerol monolaurate and said monoglycerol fatty acid ester is monoglycerol oleate.

6. The stable, acidic and transparent drink as claimed in claim 3, which is an acidic non-carbonated transparent drink.

7. The stable, acidic and transparent drink as claimed in claim 1, which is an acidic non-carbonated transparent drink.

* * * * *